United States Patent
Schneider

(10) Patent No.: US 9,473,691 B2
(45) Date of Patent: Oct. 18, 2016

(54) OPTOELECTRONIC APPARATUS AND METHOD FOR THE RECORDING OF FOCUSED IMAGES

(71) Applicant: SICK AG, Waldkirch (DE)

(72) Inventor: Florian Schneider, Waldkirch (DE)

(73) Assignee: SICK AG, Waldkirch (DE)

( * ) Notice: Subject to any disclaimer, the term of this patent is extended or adjusted under 35 U.S.C. 154(b) by 81 days.

(21) Appl. No.: 14/665,109

(22) Filed: Mar. 23, 2015

(65) Prior Publication Data

US 2015/0271386 A1 Sep. 24, 2015

(30) Foreign Application Priority Data

Mar. 24, 2014 (DE) .................. 10 2014 104 029

(51) Int. Cl.
| | |
|---|---|
| H04N 5/232 | (2006.01) |
| G02B 3/12 | (2006.01) |
| H04N 5/225 | (2006.01) |
| H04N 17/00 | (2006.01) |
| G03B 13/36 | (2006.01) |
| G01V 8/12 | (2006.01) |
| G01V 8/20 | (2006.01) |

(52) U.S. Cl.
CPC ............ *H04N 5/23212* (2013.01); *G02B 3/12* (2013.01); *G03B 13/36* (2013.01); *H04N 5/2254* (2013.01); *H04N 17/002* (2013.01); *G01V 8/12* (2013.01); *G01V 8/20* (2013.01)

(58) Field of Classification Search
CPC ............ G01V 8/12; H01V 8/20; G02B 3/12; G02B 13/36; H04N 17/002; H04N 5/2254
See application file for complete search history.

(56) References Cited

U.S. PATENT DOCUMENTS

| | | | | |
|---|---|---|---|---|
| 6,268,885 | B1 * | 7/2001 | Ohta | .................. H04N 5/23212 348/335 |
| 2012/0248190 | A1 * | 10/2012 | Ogawa | ............... G06K 7/10811 235/454 |
| 2014/0043701 | A1 * | 2/2014 | Motomura | ............. G02B 7/028 359/811 |
| 2014/0168383 | A1 * | 6/2014 | Murakami | ............... G02B 7/36 348/47 |
| 2014/0198246 | A1 * | 7/2014 | Ono | ........................ G02B 7/282 348/353 |

FOREIGN PATENT DOCUMENTS

| | | |
|---|---|---|
| DE | 102005015500 A1 | 10/2005 |
| DE | 202006017268 U1 | 3/2008 |
| DE | 202012105023 U1 | 1/2013 |
| DE | 102012104579 A1 | 12/2013 |
| EP | 2071367 A1 | 6/2009 |
| JP | 2008-519300 A | 6/2008 |
| JP | 2008-158247 A | 7/2008 |
| JP | 2012-208797 A | 10/2012 |
| WO | 2006048187 A1 | 5/2006 |

\* cited by examiner

*Primary Examiner* — Amy Hsu
(74) *Attorney, Agent, or Firm* — Nath, Goldberg & Meyer; Jerald L. Meyer

(57) ABSTRACT

An optoelectronic apparatus (10) for the detection of object information from a monitored zone (12), comprising an image sensor (16), a receiving optics (14) associated with the image sensor (16), the receiving optics having an adaptive lens (26) with variable tilt and an evaluation unit (18) for the generation of object information from a received signal of the image sensor (16) is provided. In this respect the evaluation unit (18) is adapted to determine a first position of an image feature (24) in a recording of the image sensor (16) on a control of a first tilt angle of the adaptive lens (26) and to determine a drift correction for the adaptive lens (26) from the first position.

20 Claims, 2 Drawing Sheets

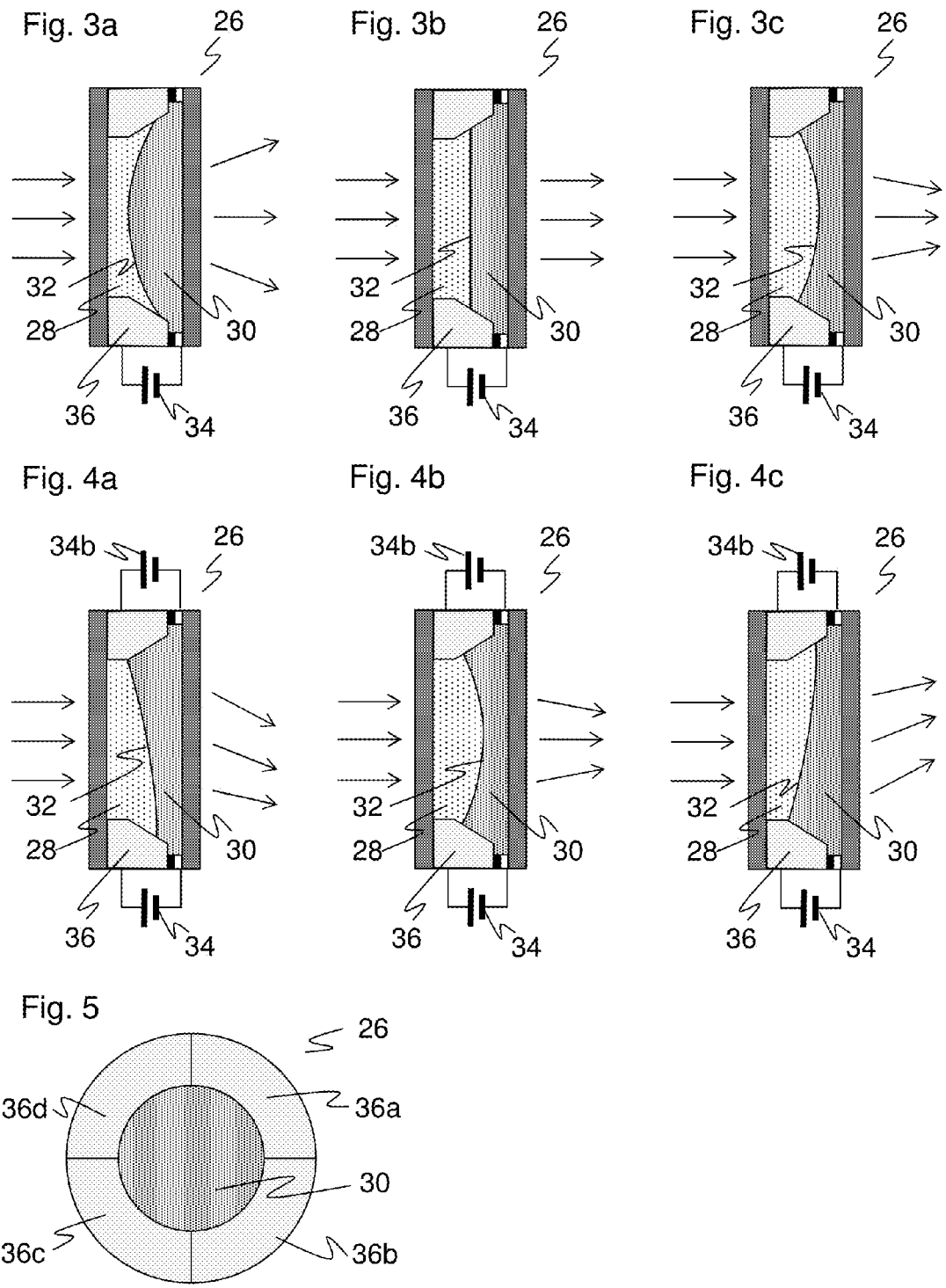

OPTOELECTRONIC APPARATUS AND METHOD FOR THE RECORDING OF FOCUSED IMAGES

Figure 1A:
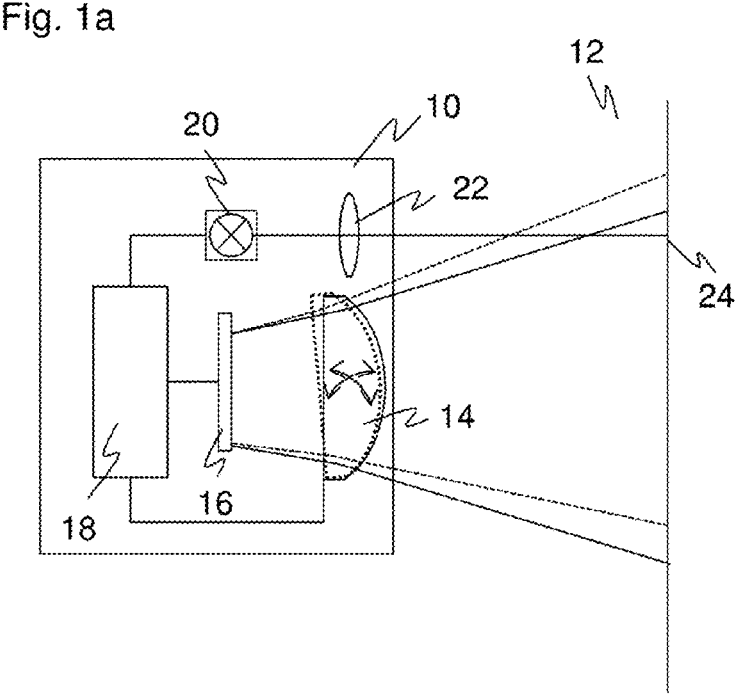

The invention relates to optoelectronic apparatus and to a method for the recording of focused images.

A transmission and/or a receiving optics is provided in nearly every optical sensor. Frequently this optics is focused at a certain distance or distance zone with the aid of a focal adjustment, in that electromechanically or optomechanically the position of the lenses and in this way the focal distance of the transmission or receiving optics is adjusted.

Such solutions require a large construction space and moreover pose high requirements with respect to the mechanical assembly having regard to the precise capability of being set, such that a predefined focal position can actually be assumed. An alternative is the use of optics in which not the focal distance itself, but rather the shape and in this way the focal length of the lens itself is varied by means of a voltage control. In particular gel or liquid lenses are used for this purpose. Having regard to a gel lens, a silicon-like liquid is mechanically deformed by means of piezo electric or inductive actuator. Liquid lenses, for example, utilize the so-called electro wetting effect, in that two non-mixable liquids are arranged above one another in a chamber. On application of a control voltage the two liquids change their surface tensions in a different manner such that the inner boundary surfaces of the liquids vary their curvature in dependence on the voltage. An optoelectronic sensor with focal adjustment on the bases of liquid lenses is known from the DE 10 2005 015 500 A1 or the DE 20 2006 017 268 U1.

Camera systems having variable focal positions can be divided into two categories. In an iterative manner autofocus systems determine the suitable focal position ("closed-loop" method) on the basis of a plurality of recordings at different focal positions. Through the required iteration this process is comparatively slow. A second possibility of focusing consists therein in determining a required focal position from a distance measurement, wherein the focus unit utilizes the default value ("open loop method"). It is then essential to ensure that the focus unit has actually achieved the desired focal position. This is critical in particular having regard to liquid or gel lenses with thermal volume expansion and temperature-dependent refractive indices. Indeed a temperature-dependent correction matrix is taught for their compensation. In this way the control of the focus unit can factor in the current temperature and counteract a temperature drift. However, also further effects such as aging can be added to the reversible temperature development that frequently cannot be foreseen in contrast to a temperature development. Therefrom a non-correctable drift and in this way a remaining blur remains.

In a further development of liquid lenses for focal adjustment the EP 2 071 367 A1 also suggests the tilting of the liquid lens through the application of different voltages in the circumferential direction. In order to prevent the recording of blurred images the proper motion of the camera is then determined and one or more lenses are tilted in the camera in order to counteract this proper motion. The possibility of the tilting however does not change anything with regard to the mentioned problems of temperature development and drift.

In the DE 10 2005 015 500 A1 a further optoelectronic sensor having a liquid lens is disclosed that can be asymmetrically changed in its beam forming properties by means of an asymmetric frame or different electric potentials at separate electrodes of the lens frame. However, the document then does not explain what purpose this can be used for.

For this reason it is the object of the invention to improve the focusing with an adaptive lens in an apparatus of this kind.

This object is satisfied by optoelectronic apparatus and by a method for the recording of focused images. The apparatus has an image sensor and an adaptive lens that can be brought into different orientations by tilting. The invention is then based on the basic idea of tilting the adaptive lens and to monitor at what position a certain image feature arrives due to the tilt by means of the image sensor. This position is varied by the drifts, this means in particular due to temperature and aging effects. Thus, from the position conclusions can be drawn on the drift and in this way on a required drift correction.

In an embodiment the adaptive lens is provided in the receiving optics of the image sensor. A tilt of the adaptive lens varies the viewing field of the image sensor and in this way the position of a certain image feature within a recording of the image sensor.

The image feature can be any recognizable structure of the scenery. Preferably the apparatus comprises a light transmitter and the evaluation unit uses a light spot or parts of an illumination pattern of the light transmitter as an image feature. In this way the apparatus is no longer dependent on the presence of such recognizable structures in the scenery. The image feature obtained from the own illumination is reliable and can be clearly recognized. For example, the light transmitter is a contrast pattern illumination or a target device, for example for displaying a recording field of a camera or a reading field of a code reader in the object region. Such a light transmitter is provided due to its own function and not purely for the drift correction in accordance with the invention.

In an alternative embodiment the adaptive lens is provided in a transmission optics of a light transmitter. If the adaptive lens is tilted in this example, then the position of the illumination pattern or of the light spot generated by the light transmitter, is moved in a recording of the image sensor. The focusing of the light transmitter is, for example, for a contrast pattern, a target pattern for referring to a certain recording or reading region or for the generation of a focused light spot. Also hybrid forms of the embodiments comprising a receiving optics or a transmission optics are plausible, in which light receiver and light transceiver are focused, be it by a common adaptive lens or by a respective adaptive lens.

The invention has the advantage with respect to the reception side use of the adaptive lens in accordance with the embodiment having the reception optics, as with the transmission side use in accordance with the transmission optics, that a quick and precise setting of the focus is enabled. This is achieved in accordance with the invention even in an open loop method, as a temperature development and aging effects of the adaptive lens and in this way of the reception optics or of the transmission optics can be determined during the operation and, if required, can be compensated. A closed-loop method would also consider these drift effects, as it applies to the actual focal position, which is comparatively slow due to the iteration.

The evaluation unit is preferably configured for the purpose of determining a second position of the image feature in a recording of the image sensor on a control of a second tilt angle of the adaptive lens and to determine the drift correction from the first position and from the second position. In this embodiment two tilt angles and two positions of the image feature determined in this way are made available for the drift correction. Further changes of the tilt angle with a determination of the respective position of the image sensor are also plausible. Vice versa it would also be plausible to determine the position of more than one image feature at one tilt angle. This leads to an extended data base from which the drift correction can be determined. An own recording can be initiated in the respective tilt angles. Alternatively, it is illuminated during the tilting in such a way that the image feature is blurred and a line is formed from the first position to the second position.

Preferably, at least one reference position is stored in a memory element and the evaluation unit determines the drift correction with reference to deviations of the first position and/or the second position from the reference position. In this way it is thus initially determined by an initial teaching or a different provision where the image feature should be expected in the respective tilt angle without drifts. Deviations from this reference position are then a measure for the drifts.

The evaluation unit is preferably configured for a regulation which regulates the controls of tilt angles by means of the drift correction in such a way that the drifts are compensated. Although it can already be advantageous to recognize a drift and to consequently, for example, output a maintenance request, the actual aim is the compensation of the drift. The drift correction namely enables this through the adaptation of the control signals transmitted to the adaptive lens in such a way that the drifts are no longer present or are respectively compensated. This can also be checked in that the regulated tilt is correspondingly controlled, whereupon the position of the image feature corresponds to that without the drift. This can be checked in advance for the verification of the procedure of the regulation and even during operation in order to ensure the correct working principle of the drift compensation.

The evaluation unit is preferably configured to set a focal distance of the adaptive lens, wherein control signals for the setting of a focal distance are corrected by means of the drift correction. Frequently, the task of the adaptive lens is not the setting of a tilt angle, but rather the focusing, or at least the focusing should also be set besides the tilt angle. For this purpose a focus table is stored in an open-loop method which includes the required control signals for a certain focal distance to be set. In order to compensate drifts, the control signals are adapted during operation on the basis of the drift correction. In this way it is assumed that a drift compensation, which compensates deviations of the position of the image features after a tilting, also compensates the focus setting to the same degree, as the adaptive lens utilizes the same physical operating principle for tilting and focusing such that this is also subjected to the same drifts.

The adaptive lens is preferably a liquid lens or a gel lens. Such lenses provide the desired setting possibilities and in this respect are very small from a construction point of view and are cost effective. The tilting of such a lens naturally does not necessarily solely include a geometric tilting, but also relates to the optical effect that effectively corresponds to a tilting.

The adaptive lens preferably has segmented control elements in the circumferential direction. The control elements are, for example, segmented electrodes that control a liquid lens via the electro wetting effect. Furthermore, segmented actuators are plausible, in particular piezo-actuators that locally change the pressure on a liquid and thereby curve a membrane on a liquid basis in a different way or that directly deform a gel-like substance of the lens. Through the segmentation in the circumferential direction a non-rotationally symmetric influencing of the lens is enabled which leads to the optical tilt.

The evaluation unit is preferably configured for the reading of code information from the object information. The apparatus in this way becomes a code reader.

The evaluation unit is preferably configured to generate a series of recordings of the monitored zone and in this respect to control the first tilt angle at least once for a drift correction. Such an apparatus thus records a series of images, for example, on assembly at a conveyor belt for the inspection or measurement of the objects conveyed thereon or for the reading of optical codes attached at these object. The images should be respectively recorded with a sharp focus. For this purpose it is plausible to insert additional recordings with the tilted adaptive lens for the finding of the focal position. The additional recordings can also be back calculated into the perspective without a tilt by means of image processing programs. Having regard to small tilt angles, this is merely a displacement of the image section to a very good approximation. In this way recordings do not have to be wasted purely for the recognition of the focal position. The drifts mentioned herein are relatively slow processes such that the calculation of the drift correction can merely also take place between longer intervals rather than for each image that is used.

The method in accordance with the invention can be adapted in a similar manner by further features and in this respect shows similar advantages. Such further advantages are described by way of example, but not conclusively in the dependent claims adjoining the independent claims.

Figure 1B:
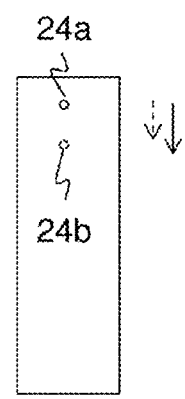
Figure 2A:
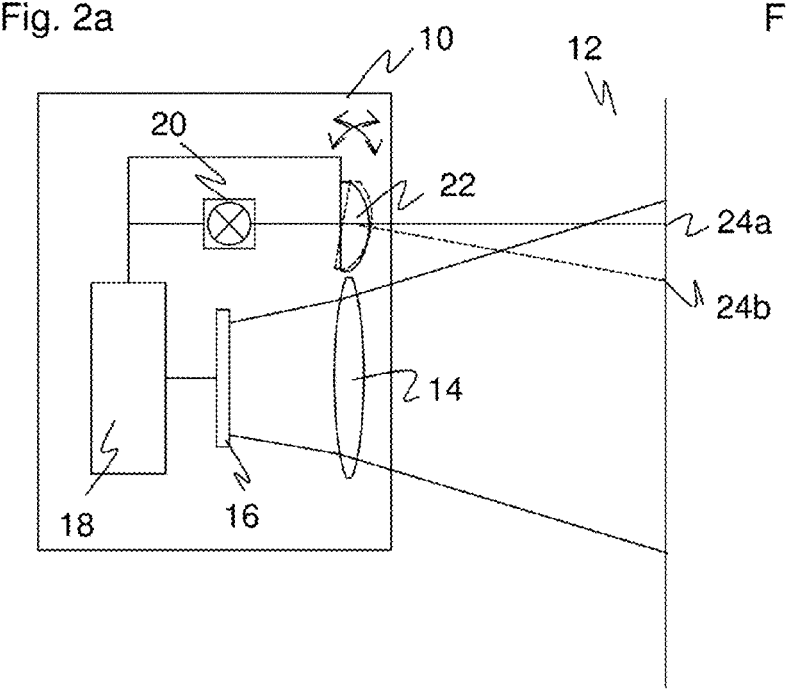
Figure 2B:
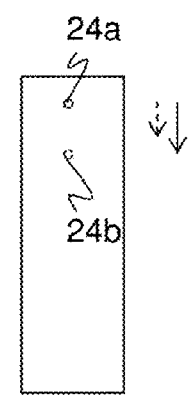

The invention will be described in the following also with regard to further advantages and features with reference to the submitted drawing by means of embodiments. The Figures of the drawing shown in:

FIG. 1a a schematic sectional illustration of an optoelectronic sensor having a tiltable adaptive lens in the receiving optics;

FIG. 1b a very simplified illustration of the recording of an image feature with the sensor in accordance with FIG. 1 in two tilt positions of the adaptive lens;

FIG. 2a a schematic sectional illustration of an optoelectronic sensor having a tiltable adaptive lens in the transmission optics;

FIG. 2b a very simplified illustration of the recording of an image feature with the sensor in accordance with FIG. 2a in two tilt positions of the adaptive lens;

FIG. 3a an illustration of an adaptive lens in a beam expanding setting;

FIG. 3b an illustration of the adaptive lens in a neutral setting;

FIG. 3c an illustration of the adaptive lens in a beam-bunching setting;

FIG. 4a an illustration of the adaptive lens with tilt downwardly;

FIG. 4b an illustration of the adaptive lens without tilt;

FIG. 4c an illustration of the adaptive lens with tilt upwardly; and

FIG. 5 a top view of the adaptive lens for the illustration of a segmented non-rotationally symmetric control.

FIG. 1 shows a schematic sectional illustration of an embodiment of an optoelectronic apparatus 10 for the detection of object information from a monitored zone 12. An image sensor 16, for example a CCD or CMOS chip generates recordings of the monitored zone 12 via a reception optics 14. The image data of these recordings are forwarded to an evaluation unit 18.

The receiving optics 16 has an adaptive lens that can be tilted through an electronic control of the evaluation unit 18. The functional principle of the adaptive lens will be described in detail in the following with reference to the FIGS. 3 to 5. In addition to the adaptive lens, for example, a fixed focal length lens having front side aperture, that is arranged upstream of the adaptive lens, or generally further optical elements such as apertures or lenses can be provided. A variation of the viewing field of the apparatus 10 results through the tilt of the adaptive lens, this means a rotation and/or a displacement.

This variation of the viewing field is used in accordance with the invention in order to measure drift effects of the adaptive lens and to possibly compensate these. The apparatus 10 further has a light transmitter 20 having a transmission optics 22. Thereby an image feature 24 that can easily be recognized is generated in the monitored zone, be it as a limited light spot of a collimated transmission light beam or as a part of a contrast pattern generated by the light transmitter 20. In a preferred embodiment the light transmitter 20 is a target apparatus or a target laser respectively, that is used for the visualization of a recording region or a reading region. In a non-illustrated embodiment a structure feature of the scenery can be used as an image feature 24 without the light transmitter 20.

The image feature 24 is localized by the evaluation unit 18 in an image recording generated by tilting the adaptive lens in order to measure drift effects. This is illustrated in FIG. 1*b*. There, the image feature 24*a* is illustrated in a first tilt position with a continuous line and with a dotted line as an image feature 24*b* in a second tilt position recorded with a time shift. As is illustrated with the adjacent continuous arrow, a displacement of the two positions results due to the tilt at which the image features 24*a-b* are recorded. This shift is brought about by the actual tilt and includes an expected portion of the controlled tilt as illustrated by a dotted arrow. The expected portion is, for example, stored in the evaluation unit 18 or in a different memory element by teaching and an additional drift component that is brought about due to deviations between controlled and actual tilt due to temperature or aging effects. In this way the drift can be measured. The spacing between the light transmitter 20 and the image sensor 16 should be as small as possible, as the displacement of the image feature 24 shows a dependency on this spacing which distorts the measured drift or makes complicated calculations necessary.

In a simple embodiment the drift is merely determined and, for example, the exceeding of a tolerance is indicated. However, it is preferred if a drift compensation takes place. For this purpose a regulation determines those controls of the adaptive lens which bring the controlled and actual tilt back into conformity, this means in the illustration in accordance with FIG. 1*b* ensure that the continuous and the dotted line become equally long.

As an alternative to the time shifted image recording an exposure is present during the tilt such that the image feature 24 is recorded as a blurred line between the two positions rather than at two separate positions. The line is possibly more easily recognizable and the line length is then the measure for the displacement including the shift.

A temperature-dependent association between the tilt position and the focal length of the adaptive lens exists, as both displacement possibilities are based on the same physical functional principle. In other words a drift of the focal length adjustment can be measured as described as a drift of the tilt adjustment. Those drift compensations which correct the tilt adjustment also lead to a drift compensation of the focal length adjustment. Frequently, the fast and reliable focus setting is the aim of the drift compensation which is determined in accordance with the invention indirectly via the displacement of the image features 24 on a tilting of the adaptive lens.

If the apparatus 10 is used in order to record complete image sequences, for example for the inspection or measurement of objects at a conveyor plant or for the reading of optical codes present on conveyed objects then the drift can be determined in sync with the regular image recording. For this purpose alternating image recordings are carried out for different tilt positions and, in as far as they are required, the effects of the tilt are subsequently compensated by the evaluation unit 18 by a subsequent image processing. If the exposure of the light transmitter 20 has such a negative effect on the recordings that their quality is no longer sufficient then it is also plausible to deactivate the light transmitter 20 during the regular image recordings and to insert intermediate recordings of the image features 24 generated by the light transmitter 20 on a tilt of the adaptive lens between regular image recordings. In this respect the sequence does not have to be stringently alternating, both a plurality of regular recordings and also a plurality of recordings for a tilted adaptive lens and an activated light transmitter 20 can follow one another. In order to accelerate the intermediate recordings, merely image sections thereof can also be read in, as the possible positions of the image pages 24 are limited.

FIG. 2 shows a further embodiment of the optoelectronic apparatus 10. This embodiment differs from the embodiment shown in FIG. 1 thereby that the adaptive lens in this example is a part of the transmission optics 22 rather than of the reception optics 14. Thus, it is not the image recording of the image sensor 16 that is focused but rather the exposure of the light transmitter 20, for example, in order to project a sharp contrast pattern, a sharp target pattern for the identification of a recording region or reading region or of a sharp light spot at a certain distance. Through a tilt of the adaptive lens, the image feature 24*a-b* not only apparently arises within the recorded image data, but rather actually in the object region at different positions. This drift correction in accordance with the invention however taking place in completely the same way as described with regard to FIG. 1. A receiving optics 14 is plausible that likewise has an adaptive lens rather than the fixed receiving optics 14 illustrated in FIG. 2, in particular having a slightly varying arrangement of the transmission and reception path, for example by means of auto-collimation of the same adaptive lens like the transmission optics 22.

The FIGS. 1 and 2 are principle illustrations that represent a plurality of sensors. Only the adaptive lens in the receiving optics and/or the transmission optics 22, as well as the drift determination based thereon is essential for the invention. A plethora of applications result in this way for the inspection and measurement of objects. Through the use of signal or image processing known for the reading of codes, a barcode scanner or a camera-based code reader results.

The FIGS. 3 and 4 show the adaptive lens of the receiving optics 14 and/or of the transmission optics 22 in an exemplary embodiment as a liquid lens 26 in accordance with the electro wetting effect. The functional principle is explained by means of the liquid lens 26, however, the invention also comprises different kinds of adaptive lenses, for example such having a liquid chamber and a membrane covering this whose curvature is changed by the pressure on the liquid, or lenses having a gel-like optically permeable material that is mechanically deformed by an actuator.

The actively tuneable liquid lens 26 has two transparent non-mixable liquids 28, 30 having different refractive indices and like density. The shape of the liquid-liquid boundary layer 32 between the two liquids 28, 30 is used for the optical function. The actuation is based on the principle of electro wetting which shows a dependency on the surface tension or boundary surface tension with respect to the applied electric field. For this reason it is possible to vary the shape of the boundary layer 32 and in this way the optical properties of the liquid lens 26 through an electric control at a connection 34, whereby corresponding voltages are applied at an electrode 36.

FIG. 3 initially shows the change of the focus properties of the liquid lens 26 already known for some time. In FIG. 3a incident light is scattered at a concave boundary layer 32. FIG. 3b shows a neutral setting with a flat boundary layer 32, whereas in FIG. 3c the boundary layer is convex and in this way bunches the incident light. It is clear that the behavior of the refractive index can be graduated in a smoother manner and a focal length can for example be set by means of corresponding intermediate positions.

The liquid lens 26 can, however, also be influenced in its tilt. This is illustrated in FIG. 4 and is based on non-rotationally symmetrically applied voltages and in this way electric fields. Correspondingly, the boundary layer 32 is non-rotationally symmetrically deformed which is utilized for the tilt. FIG. 4a shows a tilt for the liquid lens 26 downwardly, FIG. 4b shows a rotationally symmetric setting without tilt for comparison, and FIG. 4c shows a tilt of the liquid lens 26 upwardly. In this connection the direction of the tilt respectively relates to the optical effect, this means it relates to what direction the light is received from or in which direction transmission light is respectively transmitted. The tilt can respectively be superimposed on a focusing.

FIG. 5 shows a top view onto the liquid lens 26 in order to once more explain the non-rotationally symmetric control. For this purpose the electrode 36 is namely segmented. At least one additional connection 34b shown in FIG. 4 can be required for the control of the four segments 36a-d shown here by way of example. The boundary layer 32 is deformed in a non-rotationally symmetric manner and for this reason a tilt of the lens shape can be set besides the focal length through the application of different voltages at the segments 36a-d.

What is claimed is:

1. An optoelectronic apparatus for the detection of object information from a monitored zone, comprising an image sensor, a receiving optics associated with the image sensor, the receiving optics having an adaptive lens with variable tilt, and an evaluation unit for generating the object information from a received signal of the image sensor,
    wherein the evaluation unit is configured to determine a first position of an image feature in a recording of the image sensor on a control of a first tilt angle of the adaptive lens and to determine a drift correction for the adaptive lens from the first position.

2. The optoelectronic apparatus in accordance with claim 1, that has a light transmitter and wherein the evaluation unit uses a light spot or parts of an illumination pattern of the light transmitter as an image feature.

3. The optoelectronic apparatus in accordance with claim 1,
    wherein the evaluation unit is configured to determine a second position of the image feature in a recording of the image sensor on a control of a second tilt angle of the adaptive lens and to determine the drift correction from the first position and the second position.

4. The optoelectronic apparatus in accordance with claim 1,
    wherein at least one reference position is stored in a memory element and the evaluation unit determines the drift correction by means of deviations of the first position and/or of the second position from a reference position.

5. The optoelectronic apparatus in accordance with claim 1,
    wherein the evaluation unit is configured for a regulation which regulates the controls of tilt angles by means of the drift correction in such a way that the drifts are compensated.

6. The optoelectronic apparatus in accordance with claim 1,
    wherein the evaluation unit is configured to set a focal distance of the adaptive lens and wherein control signals for setting a focal distance are corrected by means of the drift correction.

7. The optoelectronic apparatus in accordance with claim 1,
    wherein the adaptive lens is a liquid lens or a gel lens.

8. The optoelectronic apparatus in accordance with claim 1,
    wherein the adaptive lens has segmented control elements in the circumferential direction.

9. The optoelectronic apparatus in accordance with claim 1,
    wherein the evaluation unit is configured for the reading of code information from the object information.

10. The optoelectronic apparatus in accordance with claim 1,
    wherein the evaluation unit is configured to generate a series of recordings of the monitored zone and in this respect to control the first tilt angle at least once for a drift correction.

11. An optoelectronic apparatus for the detection of object information from a monitored zone, comprising an image sensor, a light transmitter, a transmission optics associated with the light transmitter, the transmission optics having an adaptive lens with variable tilt and an evaluation unit for generating the object information from a received signal of the image sensor, wherein the evaluation unit is configured to determine a first position of an image feature formed by a light spot or by a part of an illumination pattern of the light transmitter in a recording of the image sensor on a control of a first tilt angle of the adaptive lens and to determine a drift correction for the adaptive lens from the first position.

12. The optoelectronic apparatus in accordance with claim 11,
    wherein the evaluation unit is configured to determine a second position of the image feature in a recording of the image sensor on a control of a second tilt angle of the adaptive lens and to determine the drift correction from the first position and the second position.

13. The optoelectronic apparatus in accordance with claim 11,
    wherein at least one reference position is stored in a memory element and the evaluation unit determines the drift correction by means of deviations of the first position and/or of the second position from a reference position.

14. The optoelectronic apparatus in accordance with claim 11, wherein the evaluation unit is configured for a regulation which regulates the controls of tilt angles by means of the drift correction in such a way that the drifts are compensated.

15. The optoelectronic apparatus in accordance with claim 11,
wherein the evaluation unit is configured to set a focal distance of the adaptive lens and wherein control signals for setting a focal distance are corrected by means of the drift correction.

16. The optoelectronic apparatus in accordance with claim 11,
wherein the adaptive lens is a liquid lens or a gel lens.

17. The optoelectronic apparatus in accordance with claim 11,
wherein the adaptive lens has segmented control elements in the circumferential direction.

18. The optoelectronic apparatus in accordance with claim 11,
wherein the evaluation unit is configured for the reading of code information from the object information.

19. The optoelectronic apparatus in accordance with claim 11,
wherein the evaluation unit is configured to generate a series of recordings of the monitored zone and in this respect to control the first tilt angle at least once for a drift correction.

20. A method for the recording of focused images in which an adaptive lens of a receiving optics is focused and tilted, the method comprising the steps of:
determining a first position of an image feature in a recording on a control of a first tilt angle of the adaptive lens;
determining a drift correction for the adaptive lens from the first position; and
correcting a drift of the focus setting of the receiving optics by means of this drift correction.

* * * * *